(12) United States Patent
On

(10) Patent No.: US 7,383,062 B1
(45) Date of Patent: Jun. 3, 2008

(54) PC CARD AND METHOD OF USING SAME

(75) Inventor: Peter On, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 0 days.

(21) Appl. No.: 11/694,544

(22) Filed: Mar. 30, 2007

(51) Int. Cl.
*H04B 1/38* (2006.01)

(52) U.S. Cl. .................. 455/558; 455/557; 455/550.1; 359/237; 359/244; 359/241; 359/240; 385/100; 385/102

(58) Field of Classification Search ................ 455/558, 455/557, 550.1; 359/172, 237, 244, 241, 359/240; 395/500; 385/89, 100, 102
See application file for complete search history.

(56) References Cited

U.S. PATENT DOCUMENTS

| | | | |
|---|---|---|---|
| 4,820,010 A | * | 4/1989 | Scifres et al. .................. 385/43 |
| 5,485,277 A | * | 1/1996 | Foster ........................ 356/445 |
| 5,652,668 A | * | 7/1997 | Aulet et al. .................... 398/23 |
| 6,005,700 A | * | 12/1999 | Pressler et al. ............. 398/117 |
| 2002/0094528 A1 | * | 7/2002 | Salafsky ........................ 435/6 |

OTHER PUBLICATIONS

Peter On, PC Card Adapter, May 17, 2007, Design Patent application 29/280123.*

* cited by examiner

*Primary Examiner*—Nay Maung
*Assistant Examiner*—Richard Chan

(57) ABSTRACT

A wireless PC card includes a housing portion including a width and a lens extending substantially the width of the housing portion; a light pipe housed by the housing portion; a substantially flat plug portion extending from the housing portion and configured to be received by a socket of a portable computer for communicating the PC card with the portable computer; an antenna for sending and receiving a wireless signal connected to the housing portion; and a circuit board including an illumination device and electronics to cause the illumination device to emit flashing illumination, causing the lens to emit flashing illumination via the light pipe while the PC card searches for a wireless signal and emit steady state illumination, causing the lens to emit steady state illumination via the light pipe while the PC card maintains a sufficient wireless signal connection.

10 Claims, 2 Drawing Sheets

PC CARD AND METHOD OF USING SAME

FIELD OF THE INVENTION

The present invention relates, in general, to wireless PC cards, and, in particular, to status indicator lighting for wireless PCMCIA modem cards.

BACKGROUND

A wireless PCMCIA (Personal Computer Memory Card International Association) modem card is a "credit card" sized modem card for use in computers utilizing and complying with the PCMCIA specifications to wirelessly connect the computer to a computer network. The wireless PCMCIA modem card is inserted into any computer equipped with a PCMCIA compliant socket. The wireless PCMCIA modem card is interchangeable with other computers, and requires only a minimal amount of physical space.

A problem with wireless PCMCIA modem cards is that they did not include status indicator lighting that clearly indicated the existence of a wireless signal connection and wireless signal strength.

SUMMARY

Accordingly, an aspect of the invention involves a wireless PCMCIA modem card with status indicator lighting that clearly indicates the existence of a wireless signal connection and wireless signal strength.

Another aspect of the invention involves a wireless PC card having a housing portion including a width and a lens extending substantially the width of the housing portion; a light pipe housed by the housing portion; a substantially flat plug portion extending from the housing portion and configured to be received by a socket of a portable computer for communicating the PC card with the portable computer; an antenna for sending and receiving a wireless signal connected to the housing portion; and a circuit board including an illumination device and electronics to cause the illumination device to emit flashing illumination, causing the lens to emit flashing illumination via the light pipe while the PC card searches for a wireless signal and emit steady state illumination, causing the lens to emit steady state illumination via the light pipe while the PC card maintains a sufficient wireless signal connection.

A further aspect of the invention involves a method of using a wireless PC card. The wireless PC card has a housing portion including a width and a lens extending substantially the width of the housing portion; a light pipe housed by the housing portion; a substantially flat plug portion extending from the housing portion; an antenna for sending and receiving a wireless signal connected to the housing portion; a circuit board including an illumination device and electronics. The method includes searching for a wireless signal from a wireless network with the antenna; causing the illumination device to emit flashing illumination with the electronics of the circuit board, causing the lens to emit flashing illumination via the light pipe, while the PC card searches for a sufficient wireless signal; receiving a sufficient wireless signal from a wireless network with the antenna; and causing the illumination device to emit steady state illumination with the electronics of the circuit board, causing the lens to emit steady state illumination via the light pipe, while the PC card maintains a sufficient wireless signal connection.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for an electronic device shown and described herein as a wireless PCMCIA modem card including status indicator lighting that clearly indicates the existence of a wireless signal connection and wireless signal strength. Although the electronic device will be described as a wireless PCMCIA modem card, in alternative embodiments, the electronic device is another type of wireless modem other than a wireless PCMCIA modem card for example, but by way of limitation, an external wireless modem. The PC card can be used with a different types of portable computers such as, but not limited to, laptops, notebooks, tablet PCs, sub-notebooks, and palm-top computers.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Elements described herein in the singular refer likewise to one or more of such elements.

Figure 1:
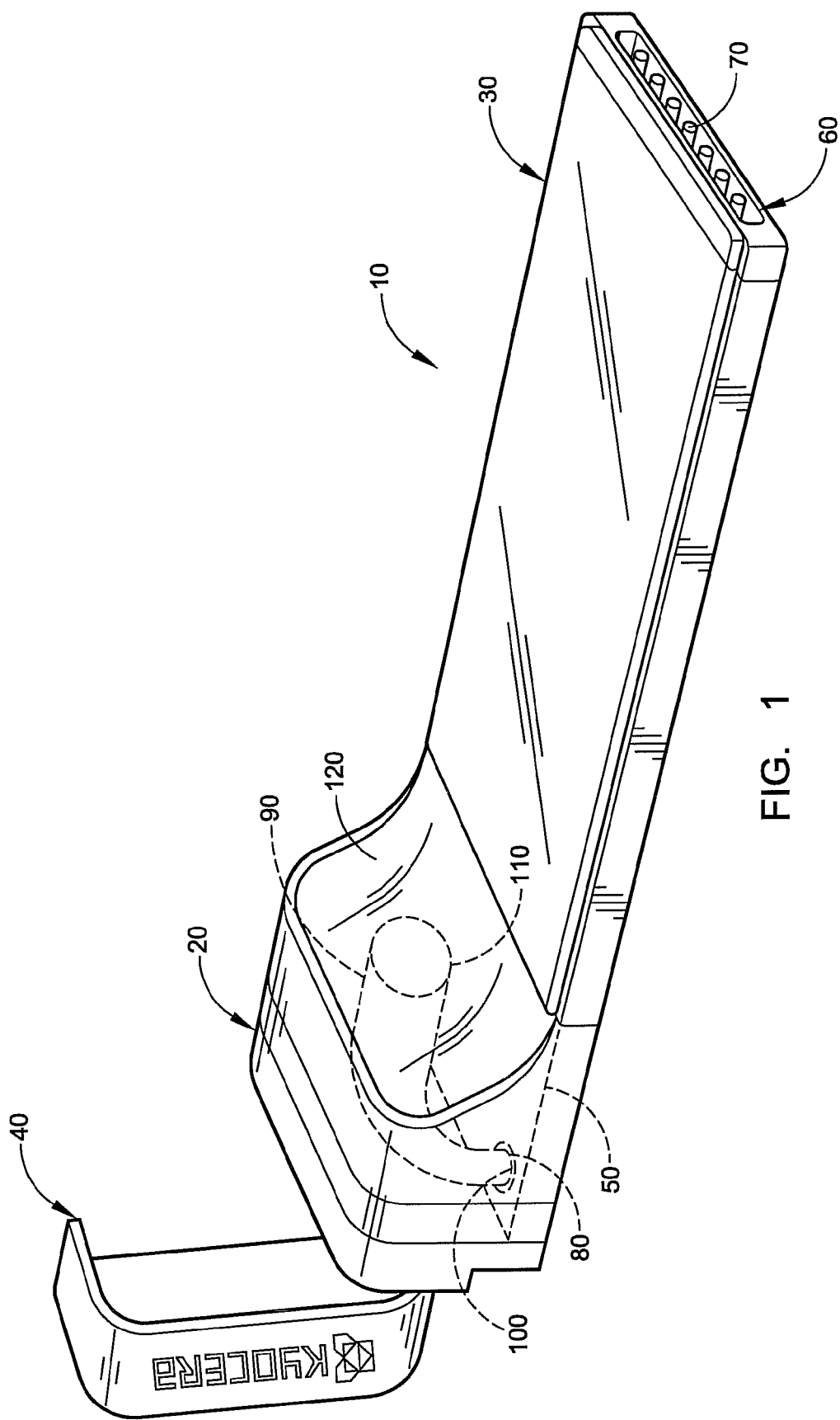
FIG. 1 is a perspective view of an embodiment of a wireless PCMCIA modem card including status indicator lighting that clearly indicates the existence of a wireless signal connection and wireless signal strength.

FIG. 1 illustrates an embodiment of wireless PCMCIA modem card ("PC card") 10. PC card 10 includes housing portion 20 and substantially flat plug portion 30. Antenna 40 is rotatably coupled to a proximal end of housing portion 20. Housing portion 20 and substantially flat rectangular plug portion 30 enclose printed circuit board 50. Printed circuit board 50 includes appropriate electronic circuitry and/or software modules to perform the wireless PCMCIA modem card functions described herein. Distal end 60 of plug portion 30 includes a plurality of conductive contacts 70 that electrically communicate and mate with corresponding electrical contacts in a socket of the host portable computer. Printed circuit board 50 includes an illumination device 80, preferably a LED, electrically coupled to the electronic circuitry of PC card 10. The illumination device 80 is activated by the electronic circuitry in response to electrical signals from the electronic circuitry indicative of the existence of a wireless signal connection and wireless signal strength. Light pipe 90 in housing portion 20 includes proximal end 100 adjacent illumination device 80 and distal end 110 adjacent to lens 120. Lens 120 is incurved (i.e., concave facing upward) and includes a width that is substantially the same as the width of the housing portion 20 and plug portion 30. Light pipe 90 transmits light from activated illumination device 80 to lens 120. Light pipe 90 and lens 120 are made of an appropriate translucent and/or transparent light transmitting material. Light transmitted to lens 120 from illumination device 80 via light pipe 90 is displayed by PC card 10 and observed by the PC card user to indicate existence of a wireless signal connection and wireless signal strength. The relatively large surface area, incurved, and wide nature of lens 120 makes the emitted illumination from PC card 10 easy for the user to see.

The electronic circuitry and one or more software modules of PC card 10 are configured to cause illumination device 80 to pulse or flash (causing lens 120 to emit a pulsing or flashing light) when PC card 10 is searching for a wireless signal. The electronic circuitry and software module(s) of PC card 10 are configured to cause illumination device 80 to be activated to maintain constant illumination (causing lens 120 to emit constant, steady state illumination) when PC card 10 establishes/maintains a wireless signal connection.

In an alternative embodiment, PC card 10 includes different-colored lights to show signal status. For example, but not by way of limitation, a red light indicates no signal, a yellow light indicates a weak signal or a sufficient signal is being searched for, and a green light indicates a good or sufficient signal. In this embodiment, the different-colored lights include different colored illumination devices (e.g., different-colored LEDs), different colored light pipe(s), and/or different colored lens(es).

Figure 2:
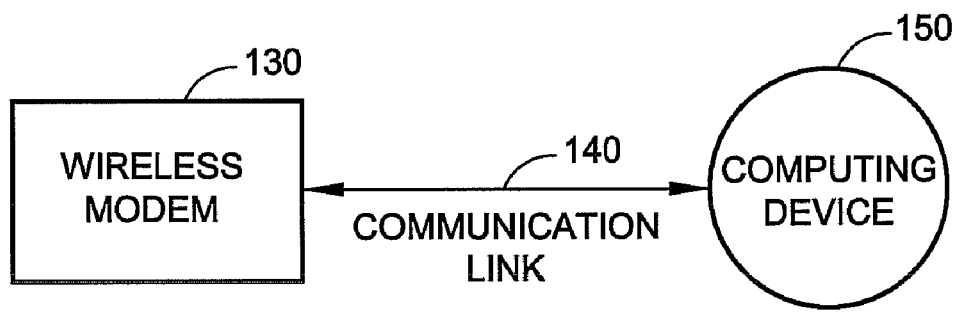
FIG. 2 is a block diagram of an embodiment of an external wireless modem connected to a computing device where the features of the wireless PCMCIA modem card are incorporated into the external wireless modem.

In the embodiment shown, PC card 10 is connected to portable computing device through a plug-and-socket connection. With reference to FIG. 2, in an alternative embodiment, the features of the PC card 10 described herein are incorporated into, for example, an external wireless modem 130. Communication link (e.g., USB cable, Ethernet cable, Bluetooth wireless link) 140 connects external wireless modem 130 to computing device 150 (e.g., desktop, laptop, notebook, tablet PC, sub-notebook, palm-top computer).

Figure 3:
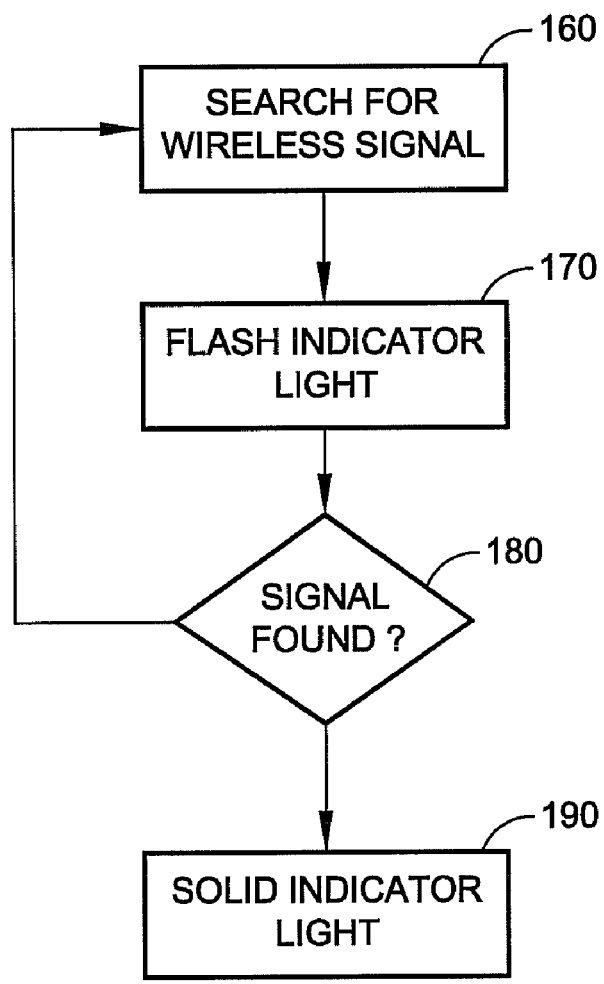
FIG. 3 is a flow chart of an exemplary method of using the wireless PCMCIA modem card.

With reference to FIG. 3, the PC card 10 will now be described in use. A user inserts the PC card 10 into a socket of a portable computer (e.g., laptop). The socket of the portable computer receives the plug portion 30 of the PC card. The PC card 10 is fully inserted into the socket so that the contacts 70 at the distal end 60 of the PC card electrically communicate and mate with the contacts in the socket. PC card 10 is powered by and communicates with the host portable computer. The user rotates the antenna 40 to the position shown in FIG. 1 (so that the antenna is substantially perpendicularly disposed relative to the housing 20). This improves the reception of PC card 10. At step 160, PC card 10 searches for a wireless signal. The electronic circuitry and software module(s) of PC card 10 cause, at step 170, illumination device 80 to pulse or flash (causing lens 120 via light pipe 90 to emit a pulsing or flashing light) while PC card 10 searches for a wireless signal. At step 180, a determination is made as to whether a sufficient signal has been found by the PC card 10. If a sufficient signal has not been found, control passes back to step 160, where PC card 10 continues searching for a sufficient wireless signal. If a sufficient signal has been found so that PC card 10 establishes/maintains a sufficient wireless signal connection, the electronic circuitry and software module(s) of PC card 10 cause, at step 190, illumination device 80 to be activated to maintain steady state illumination (causing lens 120 via light pipe 90 to maintain steady state illumination). Thus, the PC card 10 includes status indicator lighting that clearly indicates to the user the existence of a wireless signal connection and wireless signal strength, making the PC card 10 more user friendly.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A wireless PC card for a computer, the computer including a socket having a width and a height, comprising:
   a housing portion terminating in an end configured to extend outside the socket when the PC card is received in the socket, the housing portion including a width and a lens separated a distance from the end, proximal of the end, the lens having an incurved and concave facing upward configuration and extending substantially the entire width of the housing portion and the socket;
   a light pipe housed by the housing portion;
   a substantially flat plug portion extending integrally from the housing portion and configured to be received by the socket of the computer for communicating the PC card with the computer;
   an antenna for sending and receiving a wireless signal connected to the housing portion;
   a circuit board including an illumination device and electronics configured to cause the illumination device to emit flashing illumination, causing the lens to emit flashing illumination via the light pipe while the PC card searches for a wireless signal and configured to cause the illumination device to emit steady state illumination, causing the lens to emit steady state illumination via the light pipe while the PC card maintains a sufficient wireless signal connection.

2. The wireless PC card of claim 1, wherein the PC card is a wireless PCMCIA modem card.

3. The wireless PC card of claim 1, wherein the illumination device is a LED.

4. The wireless PC card of claim 1, wherein the light pipe includes a proximal end adjacent the illumination device and a distal end adjacent the lens.

5. The wireless PC card of claim 1, wherein the antenna is rotatably connected to the housing.

6. A method of using a wireless PC card with a computer, the computer including a socket having a width and a height, the wireless PC card including a housing portion terminating in an end configured to extend outside the socket when the PC card is received in the socket, the housing portion having a width and a lens separated a distance from the end, proximal of the end, the lens having an incurved and concave facing upward configuration and extending substantially the entire width of the housing portion; a light pipe housed by the housing portion; a substantially flat plug portion extending integrally from the housing portion; an antenna for sending and receiving a wireless signal connected to the housing portion; a circuit board including an illumination device and electronics, comprising:

searching for a wireless signal from a wireless network with the antenna;

causing the illumination device to emit flashing illumination with the electronics of the circuit board, causing the lens to emit flashing illumination via the light pipe, while the PC card searches for a sufficient wireless signal;

receiving a sufficient wireless signal from a wireless network with the antenna; and causing the illumination device to emit steady state illumination with the electronics of the circuit board, causing the lens to emit steady state illumination via the light pipe, while the PC card maintains a sufficient wireless signal connection.

7. The method of claim 6, wherein the PC card is a wireless PCMCIA modem card.

8. The method of claim 6, wherein the illumination device is a LED.

9. The method of claim 6, wherein the light pipe includes a proximal end adjacent the illumination device and a distal end adjacent the lens.

10. The method of claim 6, wherein the antenna is rotatably connected to the housing, and further including rotating the antenna relative to the housing based on user input.

* * * * *